July 11, 1939.  J. C. BAKER  2,165,605
BEER DRAWING APPARATUS
Filed Sept. 14, 1936   2 Sheets-Sheet 1
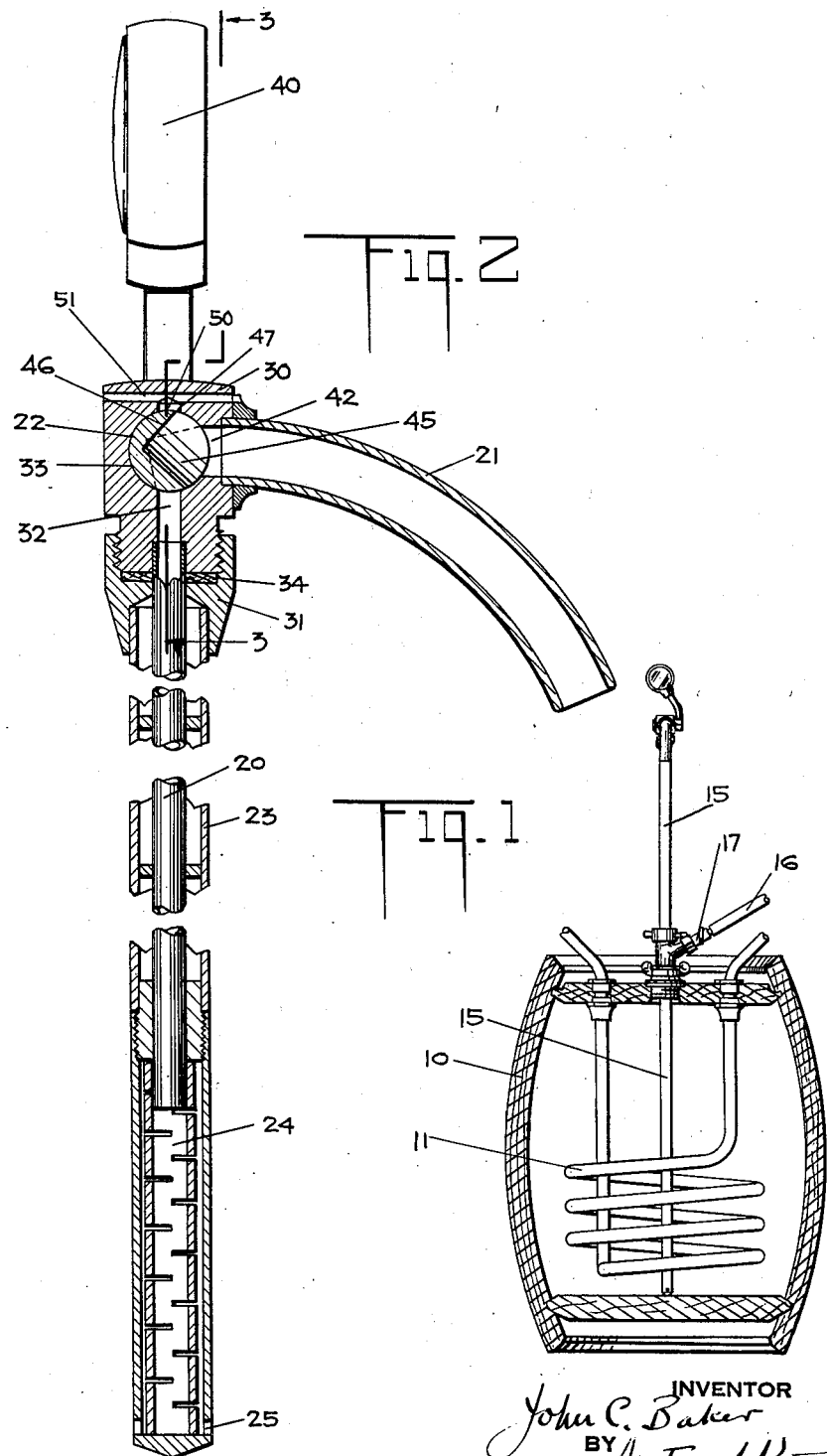

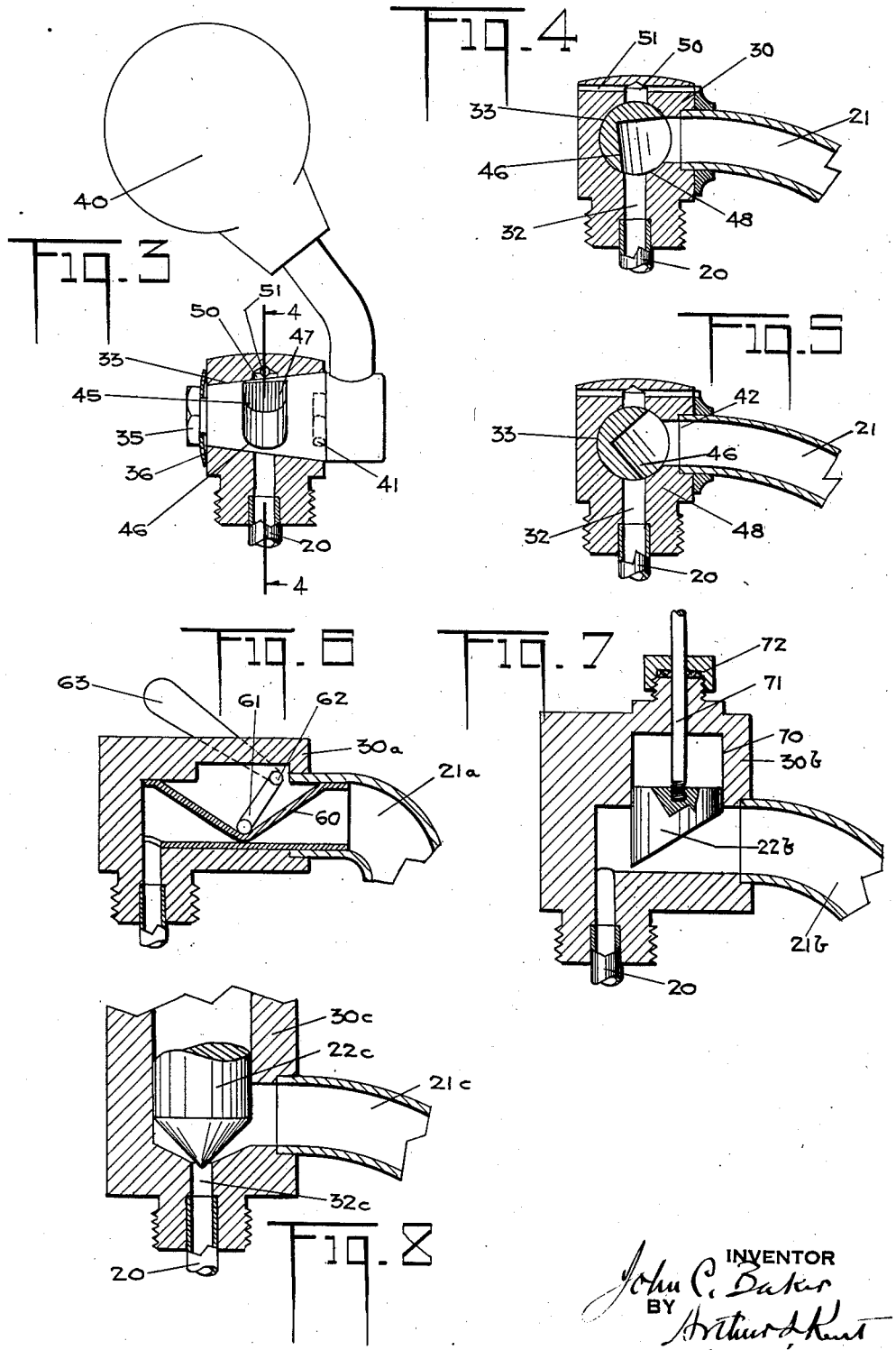

Patented July 11, 1939

2,165,605

UNITED STATES PATENT OFFICE 2,165,605

BEER DRAWING APPARATUS

John C. Baker, Montclair, N. J., assignor to Novadel-Agene Corporation, Belleville, N. J., a corporation of Delaware Application September 14, 1936, Serial No. 100,585

6 Claims. (Cl. 225—3)

This invention relates to a method and apparatus for drawing beer and other brew. The invention aims generally to provide a method and apparatus whereby the beer may easily and quickly be drawn from the keg or other container and discharged into a glass or other receptacle to fill the glass with quiescent clear live beer having substantially all the dissolved gas which it contained in the keg and surmounted by a collar, or head, of the desired amount of creamy fine-texture foam; and whereby this may be done without waste, and without requiring special skill on the part of the bartender or other attendant.

With the dispensing apparatus now generally in use a substantial amount of the gas dissolved under pressure in the beer or other brew in the keg is released from the beer as it flows through the draft tube and an excessive amount of foam is present in the beer as it is discharged into the glass and a further amount of foam forms in the glass, and the foam is of comparatively coarse texture, being formed of comparatively large bubbles. This is bad for three reasons. It causes waste of beer, since in order to have a suitable amount of clear beer in the glass when served the glass must be filled so that a large amount of beer is lost by foam over the top of the glass; it causes waste of time, since the attendant must wait before removing the filled glass for service until the body of beer in the glass is substantially clear and he has "combed off" the last excess foam; and the clear beer finally obtained in the glass has lost much of its life or zest through the escape of a large part of its dissolved gas.

The present invention comprises a method wherein the beer or other beverage is drawn from a keg or other container in which it is maintained under pressure and at dispensing temperature, and wherein the major part of the beer drawn in filling each glass or other receptacle has its pressure gradually reduced to substantially atmospheric pressure and its velocity controlled by friction as it flows at a desired rate through a passage of cross-area and length determined according to the pressure maintained on the beer in the keg, from which passage it enters at comparatively low velocity a short passage of a greater cross-area from which it is discharged into the glass quietly as a clear liquid; and wherein a small part of the brew for each filled glass is discharged into the glass, either before or after the major part, as a fine creamy foam by introducing into the outflow passage a restriction followed by a space having walls which diverge in the direction of flow, whereby, instead of the pressure being reduced gradually as the beer flows through the draft tube at full flow, the rate of flow is reduced much below the full flow rate of the tube and nearly the whole pressure drop occurs at the restriction, and, in addition, by reason of the diverging walls of the space immediately beyond the restriction, the beer is suddenly subjected to a sub-atmospheric pressure as it leaves the restriction flowing at high velocity, so that the dissolved gas in the beer is caused suddenly to expand and form minute bubbles at a multiplicity of points, thereby changing a large part, or even substantially all, of the flowing cooled liquid beer into a fine-texture creamy foam. The proportion of foam to quiet clear solid beer deposited in the glass may be varied at will as desired. The invention includes, also, apparatus for carrying out the method.

The invention involves the use of a draft tube in which when flow to the full capacity of the tube under the pressure in the container is permitted, the pressure energy of the beer is largely absorbed by friction, and which is provided with a valve which when fully opened permits full flow through the tube and the drawing of clear quiet beer, and when only slightly opened causes the delivery of a fine creamy foam. If the draft tube is a smooth bore tube of such small inside cross-area and of such length that at full flow under a given pressure on the beer in the keg the pressure energy of the beer is mostly absorbed by friction, the pressure on the beer being gradually reduced in the tube to substantially atmospheric pressure and flow velocity being comparatively low, the beer will flow quietly and smoothly from the tube into a glass or other receptacle with but very little foam. Under a greater keg pressure with the same friction tube, the flow velocity at full flow is somewhat greater, but if a discharge passage is provided of greater cross-area than the small bore friction tube, through which passage the beer is discharged from the friction tube, then, unless the keg pressure is so great as to cause too high flow velocity, the excess velocity of the beer is absorbed as it flows from the friction tube into the larger discharge passage without gas-releasing agitation, and the beer flows quietly and smoothly from such discharge passage into the glass with very little foam. A friction tube of $\frac{1}{16}''$ inside diameter and 3 ft. long with a short discharge passage of about $\frac{3}{8}''$ inside diameter serves well for drawing quiet substantial foamless beer at a suitable rate for usual bar dispensing from a keg in which the beer is cooled to dispensing temperature and maintained under a discharging pressure of about 8 lbs.

The valve, which for best results is located between the small bore friction tube and the larger discharge passage, or in the discharge passage adjacent the end of the friction tube, is so formed that when wide open it permits flow to the full capacity of the friction tube, but that when it is open only partially there will be just beyond the valve orifice a space having diverging walls or which is otherwise shaped to serve as a vacuum-producing expanding space. The restricted orifice largely reduces the flow rate so that the beer reaches the orifice under nearly the full keg pressure and flows through the orifice at high velocity, and because of this high velocity and the diverging walls just beyond the orifice the beer is suddenly subjected to a sub-atmospheric pressure. This sudden pressure drop, from a pressure nearly that on the beer in the keg to a pressure substantially below atmosphere, causes a sudden expansion of the gas dissolved in the beer whereby a large part of the solid liquid beer is changed into a fine-texture creamy foam. If the opening is small enough, all or nearly all of the beer will be converted into this fine foam. As the valve is opened wider, there will be less foam and more liquid. The dense, fine-textured, creamy foam produced in this way is more lasting than the usual larger bubble foam, and is more pleasing in appearance and increases the appetite appeal of the glass of beer.

In drawing a glass of beer, it is best first to throw the valve quickly to full open position and hold it open long enough to draw nearly a full glass of quiet beer with very little foam, and then to add the desired amount of foam by just slightly opening the valve after having closed it quickly, or by holding it for a moment in foam-forming position when closing it. The foam may be discharged into the glass first and then the quiet beer, but in drawing in that way the foam will not be of as fine texture. Good results may also be obtained by opening or closing the valve slowly, but the foam will not be as fine textured as when the quiet beer is drawn first and the foam then added. The amount of foam discharged into the glass will depend on the extent to which the valve is partially open and the length of time of partial opening, and may be varied at will by varying the extent and duration of partial opening.

The beer in the keg should be cooled and maintained cool at a substantially constant temperature and most desirably at the usually desired dispensing temperature of about 38° to 45° F. The term "dispensing temperature" as used in the claims is to be understood as meaning a temperature wthin about this range. The pressure on the beer in the keg should also be maintained substantially constant. The best dimensions for the friction tube and the discharge passage will depend on the pressure maintained on the beer in the keg, but a tube and discharge passage of given size will serve well for keg pressures varying over some considerable length. I have used with good results a friction tube of the plain smooth bore type shown about 2½ ft. long and $\frac{3}{16}$" bore with a discharge passage or spout of $\frac{3}{8}$" bore and between 3' and 4' long for keg pressures of from 4 to 10 pounds above atmosphere, but best results have been obtained with the keg pressure maintained at about 8 lbs. It is desirable, also, that the beer should carry a fairly uniform amount of the dissolved gas. The draft tube of the dimensions given, with the beer at the temperature and under the pressure stated, has been used for beer having the usual carbon dioxide content which gives a dissolved gas pressure, or equilibrium pressure, of about 15 lbs. in the cooled keg before tapping, which pressure falls somewhat in the time during which the beer is drawn. The maintained keg pressure of about 8 lbs., although somewhat less than the equilibrium pressure of the beer, is sufficient to keep the beer in suitably charged condition. A more rapid rate of drawing of the beer with the same full flow velocity in the friction tube may be obtained by using a larger valve and discharge passage and enlarging the bore and increasing the length of the friction tube.

The first beer drawn after an interval during which exposed parts of the draft tube have become more or less warmed will be somewhat warmed by contact with the flow passage walls. It is desirable, therefore, that the design of the draft tube be such that the total amount of metal or other material in the friction tube and valve and spout is as small as possible consistent with the suitable size and strength, so that on drawing the first glass of beer after any considerable interval following the previous drawing only a relatively small amount of the beer going into the glass will be so warmed, thus enabling a satisfactory glass of beer to be drawn even after an interval during which the exposed parts with which the beer comes in contact have become warmed to room temperature. Warming the beer increases the pressure of its dissolved gas and thus tends to form foam even at full flow through the draft tube. The higher the temperature of the beer, the more difficult it is to draw quiet clear beer; and, on the other hand, the colder the beer, the more difficult it is to produce the desired foam.

Other features of the invention will be brought out in the following description in connection with the accompanying drawings illustrating an approved form of draft tube for practicing the method and embodying apparatus features of the invention, and certain modifications thereof.

In said drawings:

Fig. 1 is a general view of a beer keg provided with a cooling coil and fitted with a draft tube according to the invention, the keg being shown in section and the other parts in elevation;

Fig. 2 is an enlarged sectional view of the draft tube with portions broken out, showing the valve in closed position;

Fig. 3 is a section taken on the line 3—3 of Fig. 2;

Fig. 4 is a section through the valve plug and adjacent parts taken on line 4—4 of Fig. 3 but showing the valve plug turned to full open position for drawing quiet beer;

Fig. 5 is a view similar to Fig. 4 but showing the valve plug in cracked position for drawing foam; and Figs. 6, 7 and 8 are sectional views of the valve and adjacent parts illustrating the use of valves of other forms.

Referring to the drawings, and first to Figs. 1 to 5, the keg 10 is provided with a coil 11 through which cooling fluid at controlled temperature is circulated for maintaining the beer in the keg at the desired temperature, that is, at dispensing temperature. The draft tube 15 is inserted, in the usual or any suitable manner, through the draft opening in the head of the keg, the tube extending downward to or close to the bottom end of the keg. A gas tube 16 is provided for supplying pressure gas to the space above the liquid in the keg, the gas, which is most desirably carbon dioxide, being supplied from any suitable source at the desired pressure and flowing into the keg past a check valve 17 whenever the gas pressure in the space above the liquid drops below the pressure to be maintained therein.

The draft tube comprises a velocity reducing friction tube 20, a spout 21 providing a discharge passage of greater cross-area than the friction tube, and a valve 22 between the friction tube and the spout. The friction tube 20, which, most desirably and as shown, is a small bore tube, is mounted within a casing tube 23 which protects the friction tube and provides a heat insulating air space about the portion of the tube extending above the keg, and it has at its lower end a suitable strainer 24 which as shown is formed by a tube sleeved on and extending beyond the end of the friction tube and having a plurality of narrow cross slots therein which provide narrow straining inlets the combined cross-area of which exceeds that of the friction tube. The casing tube desirably has a closed lower end to rest on the bottom of the keg and has a plurality of inlet openings 25 at its lower end the combined cross-area of which is greater than that of the friction tube.

The valve 22 as shown in Figs. 1 to 5 is a rotary plug valve mounted within a valve head, or casing, 30 which has a threaded neck screwed into a socket piece 31 secured to the upper end of the casing tube 23. From the bottom of the valve casing, considering the draft tube to be set vertically as shown, an inlet port 32 extends upward to the plug bore 33, the upper part of the bore forming this port being of the same size as the bore of the friction tube 20 and the lower part sufficiently larger to receive the end of the friction tube. A packing washer 34 between the bottom of the socket of the piece 31 and the bottom end of the neck of the valve casing serves to make a tight joint about the end of the friction tube. The plug bore 33 extends horizontally through the valve casing, and the plug and the plug bore are most desirably correspondingly tapered, the plug being held drawn into the tapered bore by a screw 35 the head of which bears against a spring washer 36. The plug carries an operating handle 40 by which it may be turned between its closed position and full open position, movement of the plug being limited by means of a stop 41 moving in a recess in the end of the valve casing as shown by dotted lines in Fig. 3. The spout 21 extends from one side of the valve casing, the casing having an outlet port 42 which extends to the valve bore 33, the inner portion of the bore forming this port being most desirably of the same size as the adjacent end of the bore of the spout, the outer portion being enlarged to receive the end of the spout. The spout is most desirably of uniform bore throughout. The upper end of the discharge passage, including the port 42, extends in a horizontal direction, or it might be at a slight downward slant, and the spout is curved downwardly, so that when the valve is closed beer in the discharge passage will drain out, means as hereinafter described being provided most desirably for venting the upper end of the passage to accelerate the draining out of such beer.

The valve plug 22 has a port 45 the shape of which may be varied somewhat, but which I have found it most desirable to make of the shape shown by forming a recess extending in from one side of the plug which is of a width lengthwise of the plug about equal to the diameter of the discharge passage and which has end walls extending at right angles to each other, one end wall 46 extending upward from the port 32 when the valve is in wide open position being rounded, and the other, 47, being flat. It is not necessary that one of these walls be rounded and the other flat, but a recess of this shape serves the purpose well and is easier to machine out in the plug than a recess having two flat walls or one having two rounded walls.

Fig. 2 shows the valve in closed position in which the solid peripheral wall of the valve closes the end of the bore 32. When the handle 40 is thrown forward and downward to wide open position as shown in Fig. 4 the ends of both the inlet port 32 and the outlet port 42 are completely open. With the valve in this position, beer will flow upward under keg pressure through the friction tube to the full capacity of the tube at a suitable rate, the pressure energy of the beer being largely absorbed by flow friction and the beer reaching the discharge end of the bore at substantially atmospheric pressure and with a velocity comparatively low but somewhat greater than it should be for discharge without gas-releasing agitation. This excess velocity is absorbed as the beer flows in to the valve port 45, which in effect forms with the valve in its full open position a continuation of the discharge passage, and the beer then flows at reduced velocity through the discharge passage. It will be seen that with the valve in this wide open position there are no shoulders or other irregularities in the flow passage to produce vacuum conditions and, therefore, foam, even when the beer is flowing at the full flow rate.

When the valve is turned to a slightly open position as shown by Fig. 5, to provide only a small orifice for the passage of beer from the friction tube, the rate of flow will be largely reduced, with the result that the beer will reach the orifice under nearly the full keg pressure and will flow through the orifice at high velocity. With the valve in this position, also, the wall 46 of the valve port and the portion 48 of the wall of the valve bore between the inlet port 32 and the outlet port 42 will diverge at such an angle that as the beer issues from the restricted orifice it will tend to expand between these diverging walls and thereby be subjected not merely to a drop in pressure nearly to atmosphere but to a drop to a sub-atmospheric pressure, and this sudden drop to sub-atmospheric pressure will cause a sudden expansion of the gas dissolved in the beer so that the beer, or a large part thereof, will change into foam and the foam will be of very fine texture. The proportion of the beer which is thus changed into foam and that which remains liquid will depend on the size of the orifice. With a very small orifice all or nearly all of the beer will be converted into foam. This foam or mixture of foam and liquid will then flow out through the discharge passage. The exact angle there should be between the diverging walls of the space just beyond the restricted orifice when the valve is in the slightly open position cannot be stated. A space of the form shown by Fig. 5 has been used and found to give excellent results. It may be noted that, because of the immediate formation of foam as the beer enters this space from the orifice, the angle between the diverging walls may be and should be much greater than they should be in order to obtain an equivalent sub-atmospheric pressure with a non-foaming liquid or one which would not develop as much foam.

A port 50 opens from the top of the plug bore to a vent passage 51 which extends through the upper part of the valve casing, the port 50 being positioned so that when the valve is closed, as shown in Fig. 2, air will be admitted to the inner upper end of the discharge passage. Any beer whether solid or foamy will thus be permitted to drain quickly from the discharge passage upon the closing of the valve. The only beer remaining in any part of the outflow passage will then be that in the vertical tube below the valve, and as the beer in the upper part of this passage becomes slightly warm, gas is released from it and all the beer in the passage flows back into the keg in a comparatively short time. Thus, no beer stands for any considerable length of time in any part of the outflow passage.

While I have found it most desirable to use a tapered plug valve such as shown, it is obvious that valves of different design may be used to serve the purposes of the invention. What is essential is that the valve in one position of adjustment shall permit the beer to flow at full capacity of the friction tube into a suitably shaped space which is in effect a continuation of the discharge passage, so that as the beer flows from the upper end of the friction tube its excess velocity will be absorbed and there will be an absence of foam developing agitation, and that when the valve is in a partially open position there will be immediately beyond the restricted orifice a vacuum-producing expanding space. Figs. 6, 7 and 8 illustrate three alternative forms of valve which have been found to give satisfactory results.

In Fig. 6 the discharge passage of the spout 21a connects with a bore in a valve body 30a into which the upper end of the friction tube extends to discharge into such bore. Fitted within the spout and the valve body bore is a tube 60 of flexible elastic material such as suitably vulcanized India rubber. Pivotally mounted within a recess opening from the top of the valve body bore is a flap 61 mounted on a spindle 62 which extends to the outside of the valve body and carries an operating handle 63. The flap 61 is rounded at its outer end and serves when turned downwardly to collapse a portion of the wall in the tube 60 downwardly and force it toward the opposite wall to a position such, for example, as shown in Fig. 6, to provide a restricted orifice with an expanding space immediately beyond the orifice. It is obvious that with this valve device in the slightly open position shown the rate of flow of the beer will be much reduced, nearly all of the pressure drop will occur at the valve orifice, and the beer flowing through the orifice at high velocity will immediately beyond the orifice be subjected to a partial vacuum resulting in the formation of fine textured foam in the manner before described. When the operating handle 63 is thrown to the right in Fig. 6 to raise the arm 61, the resilient wall of the tube will take its normal position to permit full flow of beer through the friction tube and quiet low-velocity flow out through the discharge passage. By throwing the operating handle further to the left from the position shown in Fig. 6, outflow of beer will be entirely prevented.

Fig. 7 shows a plunger valve in which the valve body 30b has a horizontal bore as in Fig. 6 into which the friction tube 20 discharges, the spout 21b being connected to the valve head to provide a discharge passage leading from the valve body bore. The valve proper 22b is formed by a plunger which may be slid up and down in a recess 70 by means of an operating rod 71 extending out through a stuffing box 72. The lower face of the valve plunger is bevelled upward in the direction of flow past the valve, and the valve is shaped with respect to the shape of the valve head bore so that when pushed all the way down any flow past the valve is prevented. When moved all the way up into the recess 70 full flow through the friction tube 20 and into the discharge passage is permitted. The opening past the valve is so large and the flow velocity past the valve so low that the recess left opposite the inclined face of the valve does not cause foam-forming eddying or other agitation. When the valve is in a slightly open position, as shown in Fig. 7, a flow-resisting orifice is provided with a vacuum-producing expanding space immediately beyond the orifice whereby beer flowing at high velocity through the orifice is, as it leaves the orifice, suddenly subjeced to a sub-atmospheric pressure resulting in the production of fine texture foam as with other valves shown.

Fig. 8 shows another form of plunger valve in which a cylindrical valve plunger 22c is mounted to move vertically in a cylindrical bore in the valve body 30c in alignment with the inlet port 32c. The valve plunger has a conical lower end, and the bottom of the bore about the inlet port in the valve body is also conical, but the angle of the cone is somewhat less than that of the conical end of the valve plunger. The valve when in closed position seats in the inlet port 32c and when drawn up high enough permits full flow through the friction tube and inlet port 32c into a space of a size and form suitable to absorb the excess velocity of the liquid. When the valve is in the partially open position shown in Fig. 8 a flow restricting orifice is provided at the end of the inlet port, and an annular vacuum-producing expanding space immediately beyond the orifice.

The term "beer" as used in the claims is to be understood as including other brews such as ale, porter, stout, weiss beer, and the like.

What is claimed is:

1. The method of drawing beer into a receptacle from a container in which the beer is maintained under a discharging pressure of more than 4 pounds above atmospheric pressure and less than the equilibrium pressure of the beer and at a dispensing temperature, which comprises drawing and discharging into the receptacle the major portion of the beer for the receptacle as quiet solid liquid by reducing the pressure on the beer gradually by friction as it flows through an outflow passage and discharging it into the receptacle without foam-forming agitation, and drawing and discharging into the receptacle a minor portion of the beer for the receptacle converted into a fine texture foam by reducing suddenly the pressure on the outflowing beer to a sub-atmospheric pressure, whereby gas dissolved in the beer is caused to expand suddenly, and discharging the resulting foam into the receptacle.

2. The method of drawing beer into a receptacle from a container in which the beer is maintained under a discharging pressure of more than 4 pounds above atmospheric pressure and less than the equilibrium pressure of the beer and at a dispensing temperature, which comprises drawing and discharging into the receptacle the major part of the beer for filling the receptacle as quiet solid liquid by controlling the flow velocity of the beer and gradually reducing the pressure on the beer substantially to atmospheric pressure by friction as it flows through a small-bore outflow passage, further reducing the flow velocity of the beer as it leaves said outflow passage, and discharging it into the receptacle without foam-forming agitation; and thereafter drawing and discharging into the receptacle a minor portion of the beer for the receptacle converted into a fine texture foam by reducing suddenly the pressure on the outflowing beer to a sub-atmospheric pressure, whereby gas dissolved in the beer is caused to expand suddenly, and discharging the resulting foam into the receptacle.

3. In the drawing of beer into a receptacle from a container in which the beer is maintained under a discharging pressure of more than 4 pounds above atmospheric pressure and less than the equilibrium pressure of the beer and at a dispensing temperature, the method which comprises permitting a minor portion of the beer for the receptacle to flow through an outflow passage in which substantially the container pressure is maintained to a restriction, and subjecting the beer suddenly as it leaves the restriction flowing at high velocity to a sub-atmospheric pressure whereby gas dissolved in the beer is caused to expand suddenly and to convert a large part of the cold liquid into fine-texture creamy foam.

4. The combination with a beer container and means for maintaining beer therein under a discharging pressure of more than 4 pounds above atmospheric pressure and less than the equilibrium pressure of the beer and at a dispensing temperature, of a draft tube having a valve at the outlet end thereof and having a spout beyond the valve, a portion of the tube being of such form and dimensions that the pressure energy of the beer is largely absorbed by friction at full flow therethrough, the spout being of greater cross-area than the main portion of the tube, and the valve being formed to provide when partially opened a vacuum-producing expanding space immediately beyond the restricted valve orifice, whereby the beer leaving the orifice at high velocity is suddenly subjected to a sub-atmospheric pressure.

5. The combination with a beer container and means for maintaining beer therein under a discharging pressure of more than 4 pounds above atmospheric pressure and less than the equilibrium pressure of the beer and at a dispensing temperature, of a draft tube having a valve at the outlet end thereof and having a spout beyond the valve, the main portion of the tube being of internal cross-section and length such that the pressure energy of the beer is largely absorbed by friction at full flow therethrough, the spout being tubular and of greater cross-area than the main portion of the tube and extending downwardly from the valve, and the valve being formed to provide when partially opened a vacuum-producing expanding space immediately beyond the restricted valve orifice, whereby the beer leaving the orifice at high velocity is suddenly subjected to a sub-atmospheric pressure, and the valve having a vent opening for admitting air to the upper inner end of the spout.

6. A device for drawing beer from a container in which beer is maintained under a discharging pressure of more than 4 pounds above atmospheric pressure and less than the equilibrium pressure of the beer and at a dispensing temperature, comprising a draft tube of internal cross-area and length such that the pressure energy of the beer entering the tube under the container pressure for which the device is intended is largely absorbed therein by friction when full flow through the tube is permitted, a valve at the outlet end of the tube, and a tubular spout beyond the valve of greater cross-area than the tube, the valve being formed to permit in full open position full flow through the tube and to provide in another position a flow-restricting orifice and a vacuum-producing expanding space immediately beyond the orifice, whereby the beer leaving the orifice at high velocity is suddenly subjected to a sub-atmospheric pressure.

JOHN C. BAKER.

CERTIFICATE OF CORRECTION.

Patent No. 2,165,605. July 11, 1939.

JOHN C. BAKER.

It is hereby certified that error appears in the printed specification of the above numbered patent requiring correction as follows: Page 2, first column, line 70, for "3' and 4'" read 3" and 4"; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.